Nov. 30, 1965  C. VAN RINSUM ETAL  3,220,389
PRECHAMBER-INJECTION INTERNAL COMBUSTION ENGINE
Filed July 6, 1964
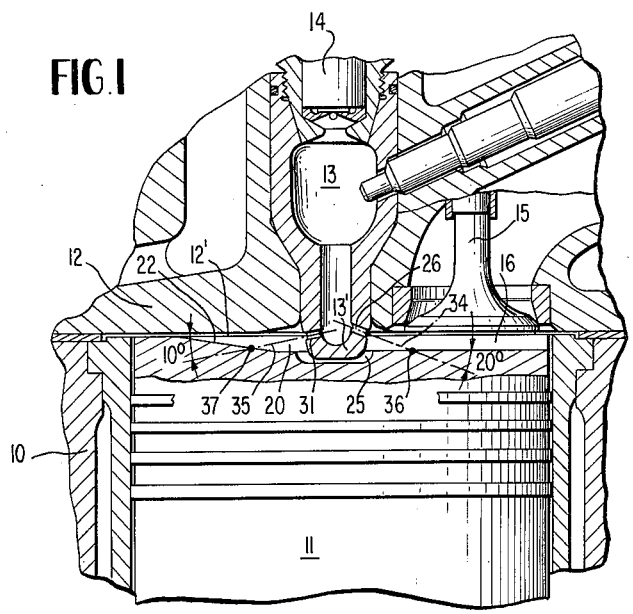
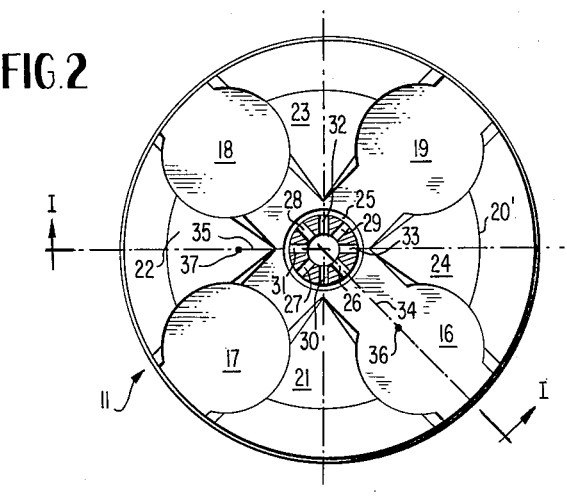
INVENTORS
CORNELIS VAN RINSUM
DIETMAR BOCKEL
BY WILHELM HÜLSSE
Dicke + Craig
ATTORNEY 3,220,389
PRECHAMBER-INJECTION INTERNAL
COMBUSTION ENGINE Cornelis van Rinsum, Stetten (Remstal), Dietmar Bockel, Neustadt, Kreis Waiblingen, and Wilhelm Hülsse, Rommelshausen, Germany, assignors to Daimler-Benz Aktiengesellschaft, Stuttgart-Untertürkheim, Germany
Filed July 6, 1964, Ser. No. 380,436
Claims priority, application Germany, July 10, 1963, D 41,945
16 Claims. (Cl. 123—32)

The present invention relates to an air-compressing injection-type internal combustion engine having a prechamber which is in communication with the cylinder space by way of eight individual, substantially radially connected discharge apertures of not the same cross section throughout. One seeks to attain by the differences in the cross section with such types of engines that the discharged prechamber content is distributed as evenly as possible over the air volume present in the cylinder space. The present invention seeks to realize this feature with internal combustion engines in which four suspended valves are arranged in the cylinder head and in which four corresponding recesses are present in the piston bottom which are to prevent a collision or interference between the valve disks and the piston bottom, a danger which otherwise occurs in particular, when the piston is very close to the cylinder head walls in the upper dead center position thereof by reason of a high compression ratio as is necessary especially with multi-fuel engines in which, for instance, $\epsilon=25$.

It is proposed in accordance with the present invention that of the eight prechamber discharge apertures, four discharge apertures with larger cross section are directed toward the recesses necessary by the presence of the suspended valves and four discharge apertures with smaller cross section are directed toward the surface portions of the piston bottom disposed between the recesses thereof-all as viewed in top plan view on the piston bottom. Important for the present invention is the fact that proper consideration was thus given in connection with the distribution of the discharged prechamber content, not only to the larger air volumes in the recesses but also to the smaller air volumes which are disposed in the more or less gap-like spaces between the unrecessed or less recessed surface portions of the piston bottom and the cylinderhead walls. By reason of the measures in accordance with the present invention the smaller air volumes are also utilized completely and satisfactorily for the eventual combustion so that such internal combustion engines, as demonstrated in practice, have favorable fuel consumptions and exhibit slight exhaust-gas cloudiness or turbidity.

The internal combustion engine according to the present invention can be so constructed that a further recess is provided within the piston bottom for the accommodation of the discharge part or orifice piece of the prechamber, with the surface portions of the piston bottom disposed between the four other recesses rising from this further recess toward the outside, whereby the axes of the four smaller discharge apertures intersect the piston bottom with the piston in the upper dead center position thereof within the area of these rising surface portions and penetrates also into the gap between the unrecessed part of the piston bottom and the cylinderhead walls. This penetration might well also be achieved in that the axes of the respective prechamber discharge apertures are directed directly into the gap. However, the discharge apertures would have to be located relatively low in order that the jets leaving the prechamber do not directly flow along the cylinderhead walls. However, with a lower location of the discharge apertures, the orifice piece or discharge part of the prechamber would project still further into the path of the piston; consequently, the present invention enables a charging or supplying of the gap with a prechamber projecting relatively slightly into the cylinder space.

In order that the axes of the smaller prechamber discharge apertures do not intersect or impinge too near to the piston center against the rising surface portions and in this manner do not impair or render difficult to the prechamber content the paths to the radially outer areas of the piston, it is recommended according to the present invention to dispose these axes more flat or level than the axes of the larger discharge apertures, i.e., to incline the axes of the larger discharge apertures more with respect to a transverse cylinder plane than the axes of the smaller discharge apertures.

It is also generally favorable if the axes of the discharge apertures of the at least approximately centrally arranged prechamber orifice piece intersect the piston bottom with the piston in the upper dead center position thereof within an area that is located at a distance of approximately ⅔ of the piston radius from the piston axis. In that case the prechamber content expands up to the rim zone of the piston bottom, however, does not reach this rim zone to any excessive extent.

Accordingly, it is an object of the present invention to provide a prechamber injection-type internal combustion engine having suspended valves, in which the prechamber content is distributed as evenly as possible over the entire air volume present in the cylinder space.

Another object of the present invention resides in the provision of a prechamber injection type internal combustion engine having suspended valves and corresponding recesses in the piston bottom to prevent interference therebetween which is so constructed and arranged that the prechamber contents are distributed particularly uniformly in relation to the non-uniform air volumes present in the cylinder space.

A further object of the present invention resides in the provision of a prechamber injection-type internal combustion engine having a plurality of suspended valves for each cylinder which not only permits relatively high compression ratios but also enables operation of the engine with different types of fuels.

Still another object of the present invention resides in the provision of a prechamber injection-type internal combustion engine of the type described above in which all air volumes present between the piston bottom and the cylinderhead walls are utilized for a particularly satisfactory combustion process resulting in good fuel consumption and slight cloudiness of exhaust gases even when operated with less desirable fuels.

Another object of the present invention resides in the provision of a prechamber injection-type internal combustion engine which achieves the foregoing aims and objects yet obviates the need of a discharge piece of the prechamber which projects relatively far onto the cylinder space and therewith into the path of the piston.

A further object of the present invention resides in the provision of a prechamber injection-type internal combusion engine in which the fuel is distributed over the entire piston area including the rim zones in a particularly favorable manner.

These and further objects, features and advantages of the present invention will become more obvious from the following description when taken in connection with the accompanying drawing which shows, for purposes of illustration only, one embodiment in accordance with the present invention, and wherein:

FIGURE 1 is a partial longitudial cross sectional view through the prechamber, combustion space and adjoining parts of an internal combustion engine in accordance with the present invention with the piston in the upper dead center position thereof, and taken along line I—I of FIGURE 2, and FIGURE 2 is a plan view on the piston with a cross section through the discharge orifice portion of the prechamber.

Referring now to the drawing wherein like reference numerals are used throughout the two views to designate like parts, the internal combustion engine illustrated therein comprises a piston 11, adapted to reciprocate within the cylinder provided within the cylinder block 10, which is closed off on top by the cylinderhead 12. The cylinderhead wall of the cylinderhead 12 facing the combustion space is designated by reference numeral 12' while reference numeral 13 designates the prechamber constituted, for example, by a conventional insert, and reference numeral 14 designates a conventional fuel injection nozzle. Four recesses 16, 17, 18, and 19 (FIGURE 2) are provided in the piston bottom of the piston 11 for the four valves associated with a respective piston of which only one valve 15 is shown. The other three valves are arranged in an analogous manner. Furthermore, a trough or recess 20 with a circumference 20' is provided in the piston bottom. The trough 20 is constituted by four rising surface portions 21, 22, 23 and 24 which start radially outwardly from an additional central recess 25 provided for the discharge part 13' of the prechamber 13.

The prechamber discharge part 13' has eight discharge apertures 26–33, and more particularly four discharge apertures 26, 27, 28 and 29 with larger cross sections and four discharge apertures 30, 31, 32 and 33 with smaller cross sections. As may be clearly seen from FIGURE 2, the axes of the larger discharge apertures 26, 27, 28 and 29, for example, the axis 34 of the discharge aperture 26, are directed toward the recesses 16, 17, 18 and 19 necessary by reason of the valves, in the case of axis 34 toward the recess 16, where as the axis of the smaller discharge apertures 30, 31, 32 and 33, for example, the axis 35 of the smaller discharge aperture 31, are directed toward the rising surface portions 21, 22, 23 and 24 disposed between the recesses 16 through 19, in case of axis 35 toward the rising surface portion 22. It may also be seen from FIGURE 1 that all axes intersect the piston bottom surface points, such as, for example, at points 36 and 37, which are at a distance of approximately ⅔ of the piston radius from the piston axis. In order to achieve this, the one set of axes, namely those of the larger discharge apertures 26 through 29, such as axis 34, are inclined at an angle of 20° to the cylinder cross plane and the other set of axes, namely the axes of the smaller discharge apertures 30–33, such as the axis 35, are inclined by an angle of 10° with respect to the cylinder transverse claim.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are encompassed by the scope of the appended claims.

We claim:
1. An air-compressing injection-type internal combustion engine comprising:
cylinder means including cylinder head means,
piston means adapted to reciprocate within said cylinder means,
prechamber means within said cylinder head means and provided in the discharge portion thereof with eight discharge apertures to establish a communication between the prechamber means and the cylinder space,
four suspended valve means in the cylinder head each including a valve disk,
said piston means being provided in the piston bottom thereof with four recesses corresponding to the four valve means to receive the valve disks thereof,
four of said discharge apertures having a larger cross section and being directed toward said recesses and the other four of said discharge apertures having a smaller cross section and being directed toward the surface portions of the piston bottom disposed between said recesses, as viewed in plan view on the piston bottom.

2. An air-compressing injection-type internal combustion engine comprising:
cyclinder means including cylinder head means,
prechamber means within said cylinder head means and provided in the discharge portion thereof with eight discharge apertures to establish a communication between the prechamber means and the cylinder space,
four suspended valve means in the cylinder head, each including a valve disk,
said piston means being provided in the piston bottom thereof with four recesses corresponding to the four valve means to receive the valve disks thereof,
four of said discharge apertures having a larger cross section and being directed toward said recesses and the other four of said discharge apertures having a smaller cross section and being directed toward the surface portions of the piston bottom disposed between said recesses, as viewed in plan view on the piston bottom,
said piston means being provided with a further recess in the piston bottom thereof for the accommodation of the discharge portion of the prechamber means,
said surface portions rising from said further recess radially outwardly,
the axes of the four discharge apertures having a smaller cross section intersecting the piston bottom with the piston in the upper dead center position thereof within the area of said rising surface portions.

3. An air-compressing injection-type internal combustion engine comprising:
cylinder means including cylinder head means,
prechamber means within said cylinder head means and provided in the discharge portion thereof with eight discharge apertures to establish a communication between the prechamber means and the cylinder space,
four suspended valve means in the cylinder head, each including a valve disk,
said piston means being provided in the piston bottom thereof with four recesses corresponding to the four valve means to receive the valve disks thereof,
four of said discharge apertures having a larger cross section and being directed toward said recesses and the other four of said discharge apertures having a smaller cross section and being directed toward the surface portions of the piston bottom disposed between said recesses, as viewed in plan view on the piston bottom,
said piston means being provided with a further recess in the piston bottom thereof for the accommodation of the discharge portion of the prechamber means,
said surface portions rising from said further recess radially outwardly,
the axes of the four discharge apertures having a smaller cross section intersecting the piston bottom with the piston in the upper dead center position thereof within the area of said rising surface portions,
said surface portions forming parts of a piston bottom trough having a smaller diameter than the piston means and being additionally recessed in the center thereof for accommodating the discharge portion of the prechamber means.

4. An air-compressing injection-type internal combustion engine comprising:
cylinder means including cylinder head means,
prechamber means within said cylinder head means and provided in the discharged portion thereof with eight discharge apertures to establish a communication between the prechamber means and the cylinder space,
four suspended valve means in the cylinder head, each including a valve disk,
said piston means being provided in the piston bottom thereof with four recesses corresponding to the four valve means to receive the valve disks thereof,
four of said discharge apertures having a larger cross section and being directed toward said recesses and the other four of said discharge apertures having a smaller cross section and being directed toward the surface portions of the piston bottom disposed between said recesses, as viewed in plan view on the piston bottom,
said piston means being provided with a further recess in the piston bottom thereof for the accommodation of the discharge portion of the prechamber means,
said surface portions rising from said further recess radially outwardly,
the axes of the four discharge apertures having a smaller cross section intersecting the piston bottom with the piston in the upper dead center position thereof within the area of said rising surface portions,
the axes of the discharge apertures having the larger cross section being inclined by a larger angle with respect to a cylinder cross plane than the axes of the discharge apertures having the smaller cross section.

5. An air-compressing injection-type internal combustion engine comprising:
cylinder means including cylinder head means,
prechamber means within said cylinder head means and provided in the discharged portion thereof with eight discharge apertures to establish a communication between the prechamber means and the cylinder space,
four suspended valve means in the cylinder head, each including a valve disk,
said piston means being provided in the piston bottom thereof with four recesses corresponding to the four valve means to receive the valve disks thereof,
four of said discharge apertures having a larger cross section and being directed toward said recesses and the other four of said discharge apertures having a smaller cross section and being directed toward the surface portions of the piston bottom disposed between said recesses, as viewed in plan view on the piston bottom,
said piston means being provided with a further portion of the prechamber means,
said surface portions rising from said further recess radially outwardly,
the axes of the four discharge apertures having a smaller cross section intersecting the piston bottom with the piston in the upper dead center position thereof within the area of said rising surface portions,
the axes of the discharge apertures having the larger cross section being inclined by a larger angle with respect to a cylinder cross plane than the axes of the discharge apertures having the smaller cross section,
said larger angle amounting to about 20° and said smaller angle to about 10° with respect to said cylinder cross plane.

6. An air-compressing injection-type internal combustion engine comprising:
cylinder means including cylinder head means,
piston means adapted to reciprocate within said cylinder means,
prechamber means with said cylinder head means and provided in the discharge portion thereof with eight discharge apertures to establish a communication between the prechamber means and the cylinder space,
four suspended valve means in the cylinder head each including a valve disk,
said piston means being provided in the piston bottom thereof with four recesses corresponding to the four valve means to receive the valve disks thereof,
four of said discharge apertures having a larger cross section and being directed toward said recesses and the other four of said discharge apertures having a smaller cross section and being directed toward the surface portions of the piston bottom disposed between said recesses, as viewed in plan view on the piston bottom,
the axes of the discharge apertures of said prechamber discharge portion, which is arranged at least approximately centrally, intersecting the piston bottom in the upper dead center position of said piston means within an area that is at a distance of approximately ⅔ of the piston radius from the piston axis.

7. An air-compressing injection-type internal combustion engine comprising:
cylinder means including cylinder head means,
piston means adapted to reciprocate within said cylinder means,
prechamber means within said cylinder head means and provided in the discharge portion thereof with eight discharge apertures to establish a communication between the prechamber means and the cylinder space,
four suspended valve means in the cylinder head each including a valve disk,
said piston means being provided in the piston bottom thereof with four recesses corresponding to the four valve means to receive the valve disks thereof,
four of said discharge apertures having a larger cross section and being directed toward said recesses and the other four of said discharge apertures having a smaller cross section and being directed toward the surface portions of the piston bottom disposed between said recesses, as viewed in plan view on the piston bottom,
said piston means being provided with a further recess in the piston bottom thereof for the accommodation of the discharge portion of the prechamber means,
said surface portions rising from said further recess radially outwardly,
the axes of the four discharge apertures having a smaller cross section intersecting the piston bottom with the piston in the upper dead center position thereof within the area of said rising surface portions,
said surface portions forming parts of a piston bottom trough having a smaller diameter than the piston means and being additionally recessed in the center thereof for accommodating the discharge portion of the prechamber means,
the axes of the discharge apertures having the larger cross section being inclined by a larger angle with respect to a cylinder cross plane than the axes of the discharge apertures having the smaller cross section,
said larger angle amounting to about 20° and said smaller angle to about 10° with respect to said cylinder cross plane,
the axes of the discharge apertures of said prechamber discharge portion, which is arranged at least approximately centrally, intersecting the piston bottom in the upper dead center position of said piston means within an area that is at a distance of approximately ⅔ of the piston radius from the piston axis.

8. An air-compressing injection-type internal combustion engine comprising:

cylinder means including cylinder head means, piston means adapted to reciprocate within said cylinder means, prechamber means within said cylinder head means and provided in the discharge portion thereof eight discharge apertures to establish a communication between the prechamber means and the cylinder space, four suspended valve means in the cylinder head, each including a valve disk, said piston means being provided in the piston bottom thereof with four recesses corresponding to the four valve means to receive the valve disks thereof, four of said discharge apertures having a larger cross section and being directed toward said recesses and the other four of said discharge apertures having a smaller cross section and being directed toward the surface portions of the piston bottom disposed between said recesses, as viewed in plan view on the piston bottom, the axes of the discharge apertures having the larger cross section being inclined by a larger angle with respect to a cylinder cross plane than the axes of the discharge apertures having the smaller cross section.

9. An internal combustion engine comprising:

cylinder means including cylinder head means, piston means adapted to reciprocate within said cylinder means, prechamber means within said cylinder head means and provided in the discharge portion thereof with a plurality of discharge apertures to establish a communication between the prechamber means and the cylinder space, a plurality of suspended valve means in the cylinder head and each provided with a valve disk, said piston means being provided in the piston bottom thereof with a number of recesses corresponding to the number of valve means to receive the valve disks, the number of discharge apertures being twice the number of recesses, one-half the number of apertures having a larger cross section and being directed toward said recesses and the other half of the apertures having a smaller cross section and being directed toward the surface portions of the piston bottom disposed between said recesses, as viewed in plan view on the piston bottom.

10. An internal combustion engine comprising:

cylinder means including cylinder head means, piston means adapted to reciprocate within said cylinder means, prechamber means within said cylinder head means and provided in the discharge portion thereof with a plurality of discharge apertures to establish a communication between the prechamber means and the cylinder space, a plurality of suspended valve means in the cylinder head and each provided with a valve disk, said piston means being provided in the piston bottom thereof with a number of recesses corresponding to the number of valve means to receive the valve disks, the number of discharge apertures being twice the number of recesses, one-half the number of apertures having a larger cross section and being directed toward said recesses and the other half of the apertures having a smaller cross section and being directed toward the surface portions of the piston bottom disposed between said recesses, as viewed in plan view on the piston bottom, said piston means being provided with a further recess in the piston bottom thereof for the accommodation of the discharge portion of the prechamber means, said surface portions rising from said further recess radially outwardly, the axes of the discharge apertures having the smaller cross section intersecting the piston bottom with the piston in the upper dead center position thereof within the area of said rising surface portions.

11. An internal combustion engine comprising:

cylinder means including cylinder head means, piston means adapted to reciprocate within said cylinder means, prechamber means within said cylinder head means and provided in the discharge portion thereof with a plurality of discharge apertures to establish a communication between the prechamber means and the cylinder space, a plurality of suspended valve means in the cylinder head and each provided with a valve disk, said piston means being provided in the piston bottom thereof with a number of recesses corresponding to the number of valve means to receive the valve disks, the number of discharge apertures being twice the number of recesses, one-half the number of apertures having a larger cross section and being directed toward said recesses and the other half of the apertures having a smaller cross section and being directed toward the surface portions of the piston bottom disposed between said recesses, as viewed in plan view on the piston bottom, said surface portions forming parts of a piston bottom trough having a smaller diameter than the piston means and being additionally recessed in the center thereof for accommodating the discharge portion of the prechamber means.

12. An internal combustion engine comprising:

cylinder means including cylinder head means, piston means adapted to reciprocate within said cylinder means, prechamber means within said cylinder head means and provided in the discharge portion thereof, with a plurality of discharge apertures to establish a communication between the prechamber means and the cylinder space, a plurality of suspended valve means in the cylinder head and each provided with a valve disk, said piston means being provided in the piston bottom thereof with a number of recesses corresponding to the number of valve means to receive the valve disks, the number of discharge apertures being twice the number of recesses, one-half the number of apertures having a larger cross section and being directed toward said recesses and the other half of the apertures having a smaller cross section and being directed toward the surface portions of the piston bottom disposed between said recesses, as viewed in plan view on the piston bottom, the axes of the apertures having the larger cross section being inclined by a larger angle with respect to a cylinder cross plane than the axes of the discharge apertures having the smaller cross section.

13. An internal combustion engine comprising:

cylinder means including cylinder head means, piston means adapted to reciprocate within said cylinder means, prechamber means within said cylinder head means and provided in the discharge thereof with a plurality of discharge apertures to establish a communication between the prechamber means and the cylinder space, a plurality of suspended valve means in the cylinder head and each provided with a valve disk, said piston means being provided in the piston bottom thereof with a number of recesses corresponding to the number of valve means to receive the valve disks, the number of discharge apertures being twice the number of recesses, one-half the number of apertures having a larger cross section and being directed toward said recesses and the other half of the apertures having a smaller cross section and being directed toward the surface portions of the piston bottom disposed between said recesses, as viewed in plan view on the piston bottom, the axes of the discharge apertures of said prechamber discharge portion intersecting the piston bottom in the upper dead center position of said piston means within an area that is at a distance of approximately ⅔ of the piston radius from the piston axis.

14. An internal combustion engine comprising:

cylinder means including cylinder head means, piston means adapted to reciprocate within said cylinder means, prechamber means within said cylinder head means and provided in the discharge portion thereof with a plurality of discharge apertures to establish a communication between the prechamber means and the cylinder space, a plurality of suspended valve means in the cylinder head and each provided with a valve disk, said piston means being provided in the piston bottom thereof with a number of recesses corresponding to the number of valve means to receive the valve disks, the number of discharge apertures being twice the number the recesses, one-half the number of apertures having a larger cross section and being directed toward said recesses and the other half of the apertures having a smaller cross section and being directed toward the surface portions of the piston bottom disposed between said recesses, as viewed in plan view on the piston bottom, said piston means being provided with a further recess in the piston bottom thereof for the accommodation of the discharge portion of the prechamber means, said surface portions rising from said further recess radially outwardly, the axes of the discharge apertures having the smaller cross section intersecting the piston bottom with the piston in the upper dead center position thereof within the area of said rising surface portions, said surface portions forming parts of a piston bottom trough having a smaller diameter than the piston means and being additionally recessed in the center thereof for accommodating the discharge portion of the prechamber means, the axes of the apertures having the larger cross section being inclined by a larger angle with respect to a cylinder cross plane than the axes of the discharge apertures having the smaller cross section, the axes of the discharge apertures of said prechamber discharge portion intersecting the piston bottom in the upper dead center position of said piston means within an area that is at a distance of approximatedl ⅔ of the piston radius from the piston axis.

15. An internal combustion engine comprising:

cylinder means including cylinder head means, piston means adapted to reciprocate within said cylinder means, prechamber means within said cylinder head means and provided in the discharge portion thereof with a plurality of discharge apertures to establish a communication between the prechamber means and the cylinder space, a plurality of suspended valve means in the cylinder head and each provided with a valve disk, said piston means being provided in the piston bottom thereof with a number of recesses corresponding to the number of valve means to receive the valve disks, the number of discharge apertures being twice the number of recesses, one-half the number of apertures having a larger cross section and being directed toward said recesses and the other half of the apertures having a smaller cross section and being directed toward the surface portions of the piston bottom disposed between said recesses, as viewed in plan view on the piston bottom, said piston means being provided with a further recess in the piston bottom thereof for the accommodation of the discharge portion of the prechamber means, said surface portions rising from said further recess radially outwardly, the axes of the discharge apertures having the smaller cross section intersecting the piston bottom with the piston in the upper dead center position thereof within the area of said rising surface portions, said surface portions forming parts of a piston bottom trough having a smaller diameter than the piston means and being additionally recessed in the center thereof for accommodating the discharge portion of the prechamber means.

16. An internal combustion engine comprising:

cylinder means including cylinder head means, piston means adapted to reciprocate within said cylinder means, prechamber means within said cylinder head means and provided in the discharge portion thereof with a plurality of discharge apertures to establish a communication between the prechamber means and the cylinder space, a plurality of suspended valve means in the cylinder head and each provided with a valve disk, said piston means being provided in the piston bottom thereof with a number of recesses corresponding to the number of valve means to receive the valve disks, the number of discharge apertures being twice the number of recesses, one-half the number of apertures having a larger cross section and being directed toward said recesses and the other half of the apertures having a smaller cross section and being directed toward the surface portions of the piston bottom disposed between said recesses, as viewed in plan view on the piston bottom, the axes of the apertures having the larger cross section being inclined by a larger angle with respect to a cylinder cross plane than the axes of the discharge apertures having the smaller cross section, the axes of the discharge apertures of said prechamber discharge portion intersecting the piston bottom in the upper dead center position of said piston means within an area that is at a distance of approximately ⅔ of the piston radius from the piston axis.

No references cited.

RICHARD B. WILKINSON, *Pirmary Examiner*,